Oct. 29, 1963  J. B. NORGAARD  3,108,479
WHEEL BALANCING APPARATUS
Filed May 31, 1962
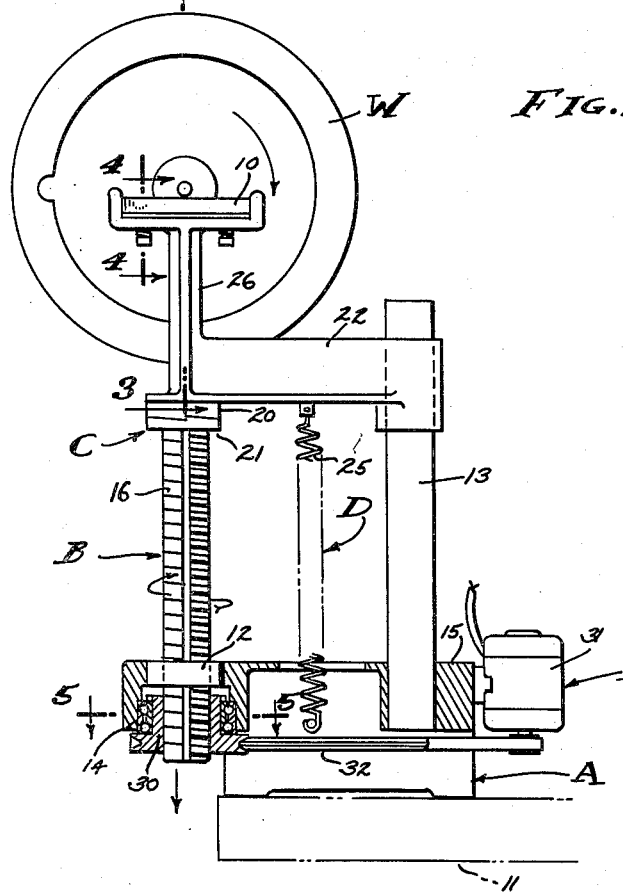
FIG. 1.
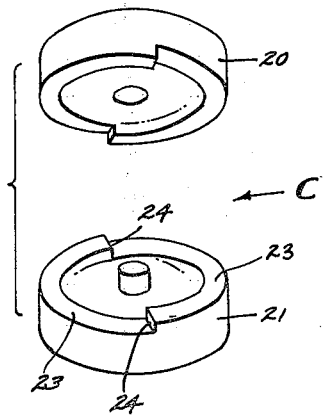
FIG. 2.
FIG. 4.
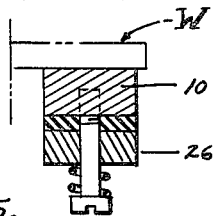
FIG. 3.
FIG. 5.
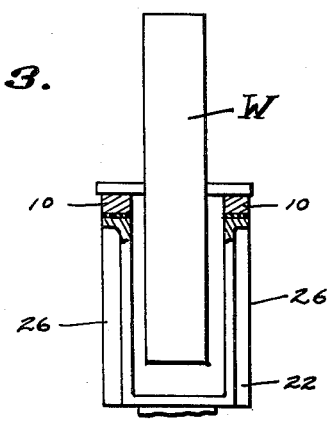
INVENTOR.
JOHANNES B. NORGAARD
BY
W. H. Maxwell
AGENT

United States Patent Office 3,108,479
Patented Oct. 29, 1963

3,108,479
WHEEL BALANCING APPARATUS
Johannes B. Norgaard, VA Branch Post Office General
Delivery, Los Angeles, Calif.
Filed May 31, 1962, Ser. No. 198,836
10 Claims. (Cl. 73—481)

This invention relates to a wheel balancing apparatus and is particularly concerned with removing friction from a pivot during a sufficient length of time to enable gravity to act as efficiently as possible upon the wheel.

Wheel balancing is a very exacting art and one of the problems involved is the friction at the center axis of turning, or at the pivot of the wheel. Precise bearings can be provided and nevertheless friction is always present to a certain degree. As a result, time-consuming and tedious methods must be resorted to in the balancing of a wheel or the like.

An object of this invention is to provide an apparatus that facilitates and speeds up the balancing of a wheel or the like, by intermittently removing friction from the pivotal support of the wheel.

Another object of this invention is to provide an apparatus that periodically maintains the constant inertia of a support for a wheel or the like.

It is another object of this invention to provide an apparatus that intermittently interrupts the said constant inertia of a support for a wheel or the like, by intermittently dropping the same.

It is still another object of this invention to provide an apparatus that accelerates the above mentioned dropping of a support for a wheel or the like.

The various objects and features of this invention will be fully understood from the following detailed description of a typical preferred form and application thereof, throughout which description reference is made to the accompanying drawings, in which:

FIG. 1 is a side elevation of a typical embodiment of the invention.

FIG. 2 is a perspective view of parts I provide.

FIG. 3 is a sectional view taken as indicated by line 3—3 on FIG. 1.

FIG. 4 is a sectional view taken as indicated by line 4—4 on FIG. 1.

FIG. 5 is a sectional view taken as indicated by line 5—5 on FIG. 1.

This invention deals with motion, used to enable a person to accurately and quickly balance a wheel or the like. Although the motion involved can be generated in various ways it is preferred that a mechanical embodiment be used as shown. Generally, a wheel W to be balanced is set upon a pair of spaced anvils 10 for rolling support, and the said anvils 10 are periodically maintained at fixed states of inertia and intermittently dropped from one of said fixed states to another. That is, the supporting anvils 10 are successively dropped an increment at a time, there being an acceleration during said drop in excess of the normal acceleration effected by gravity. The anvils are tensioned in working position by means of spring biased studs, there being a cushion support underlying each anvil (see FIG. 4).

In order to carry out the process above set forth, the apparatus that I provide involves generally, a frame A, an elevating means B, a drop means C, an accelerating means D, and a drive means E. The elements A through E are combined as illustrated in the drawings.

The frame A is adapted to be mounted on a bench 11 and is characterized by a nut 12 to pass the screw of means B later described, by a guide 13 for the cam means C later described, and by bearings 14 and a support 15 for the drive means E later described. The nut 12 is fixed in the frame A, preferably at or overhanging the front edge of the bench 11, and on an exactly vertically disposed axis. The guide 13 is at the rear of the frame A and is, for example, a cylindrical post disposed on a vertical axis parallel with the axis of the nut. The bearing 14 preferably underlies the nut 12 on the axis of the said nut, and the mounting 15 is preferably at the rear of the frame A adjacent the guide 13. As shown, the parts 12, 13, 14 and 15 are all above the working plane of the bench 11.

The elevating means B is preferably a screw means in form as illustrated, and is a rotatable screw 16 threaded into the nut 12. The screw 16 is of a single pitch and for example of a left-hand thread, so that turning of the screw clockwise as indicated by the arrow results in lowering of the screw 16 through nut 12. It will be apparent that lowering of the screw 16 will be uniform at a fixed rate, with uniform continuous turning thereof.

The drop means C is preferably a cam means in the form of complementary cam elements 20 and 21, one fixed against rotation and the other turned synchronously with turning of the screw 16. In the form of invention illustrated the cam element 20 is on a carriage 22 adapted to reciprocate vertically, while the cam element 21 is on the upper end of the screw 16. Thus, the cam element 21 turns with the screw 16, there being a pilot projecting from one cam into the other in order to maintain concentricity. Since the cam 21 turns with the screw 16 the said cam has an axially inclined face 23 and in carrying out the preferred form of this invention the rise of the cam face 23 is slightly less than the rise of the pitch of threads of screw 16. However, the cam element 21 (and 20) is pitched so as to lift when the screw 16 lowers, also left-handed so as to lift cam element 20 when the screw 16 is turned clockwise. As a result of the lesser rise of the cam face or faces 23, there is a differential motion resulting in a constant rate of lowering, or a constant rate of inertia. In the case illustrated, the cam 21 has a pair of faces 23, 180° each, with diametrically opposite shoulders 24 that drop the cam element 20 every half turn of the screw 16. The number of drops can be selected as desired. It is thus apparent that the cam element 20 descends at a fixed rate during a predetermined period while the screw 16 turns and lowers itself, and at each shoulder 24 an incremental drop occurs which intermittently lowers the cam element 20.

The accelerating means D is provided to urge the cam element 20 downwardly in addition to gravitational force. The guide 13, above referred to, receives a vertically shiftable carriage 22 that slides thereon and which is supported by the cam element 20. The carriage 22 acts to prevent rotation of cam element 20, permitting the cam element 20 to rise and fall along the vertical axis of the screw 16. The means D in its simplest form is a spring 25 that pulls between the frame A and carriage 22. The spring 25 is vertically disposed and yieldingly urges the carriage 22 and cam element 20 in a downward direction.

In practice, the carriage 22 is a light weight part and it has a pair of legs 26 that project upwardly from the cam element 20 to carry the anvils 10. The anvils 10 are straight horizontally disposed parallel parts with their top faces lying in a common horizontal plane. Thus, the rolling axle or pivot of a wheel can readily roll thereupon.

The drive means E involves a hub 30 journalled in the bearing 14 and a drive motor 31 or the like carried on the mounting 15. I have shown an electric motor 31 operating the hub 30 through a belt 32, to rotate the screw 16. The screw 16 has a longitudinal keyway 34 therein to slidably receive a key 33 projecting from the hub 30, whereby the hub and screw are in driving engagement during reciprocation of the screw.

In order to operate the apparatus, the screw 16 is raised to an elevated position by lifting the carriage 22 and reversing the motor 31. A split nut 12 can be used if so desired, to release the screw 16. The wheel W is then rested upon the pair of anvils 10 and the cam element 20 engaged upon the cam element 21. Motor 31 is then operated to turn the hub 30, to revolve the screw 16 in the nut 12. By turning the screw clockwise the descent of the cam element 20, carriage 22, anvils 10 and wheel W is periodically maintained at a fixed rate, interrupted intermittently by dropping action. As a result, the wheel is dropped one increment at a time and held at a fixed rate of descent periodically between each drop. Further, each drop is characterized by an acceleration of the cam element 20, carriage 22 and anvils 10 that exceeds the normal gravitational acceleration of the wheel W, whereby friction is intermittently and momentarily removed from the anvil, the pivot support for the wheel W. The cycle of operation is repeated as the screw 16 is rotated and the repeated accelerated dropping action permits the heavy or weighted portion of the wheel W to drop freely by gravitational action.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. Apparatus for balancing wheels and including:
   (a) an anvil for the support of a wheel pivot,
   (b) elevating means to carry the anvil at a fixed rate of inertia,
   (c) drop means to intermittently lower the anvil,
   (d) and means in addition to gravity to accelerate the anvil,
   (e) whereby friction is momentarily released between the anvil and wheel pivot.

2. Apparatus for intermittently lowering a wheel pivot and including:
   (a) an anvil for the support of a wheel pivot,
   (b) an elevating screw to rotate and lower at a fixed rate of inertia,
   (c) and a drop cam to synchronously rotate with the screw and lift at a fixed rate, and to intermittently drop the anvil,
   (d) whereby friction is momentarily removed from the anvil support of the wheel pivot.

3. Apparatus for intermittently lowering a wheel pivot and including:
   (a) an anvil for the support of a wheel pivot,
   (b) an elevating screw to rotate and lower at a fixed rate of inertia,
   (c) a drop cam to synchronously rotate with the screw and lift at a lesser fixed rate, and to intermittently drop the anvil,
   (d) and means in addition to gravity to accelerate the dropping of the cam and anvil,
   (e) whereby friction is momentarily removed from the anvil support of the wheel pivot.

4. Apparatus for intermittently lowering a wheel pivot and including:
   (a) a pair of spaced and parallel anvils for the support of the wheel pivot,
   (b) an elevating screw to rotate and lower at a fixed rate,
   (c) and a drop cam to synchronously rotate with the screw to periodically carry the anvils at a fixed rate of descent and to intermittently drop the anvils,
   (d) whereby friction is momentarily removed from the anvil support of the wheel pivot.

5. Apparatus for intermittently lowering a wheel pivot and including:
   (a) a pair of spaced and parallel anvils for the support of the wheel pivot,
   (b) an elevating screw to rotate and lower at a fixed rate,
   (c) a drop cam to synchronously rotate with the screw to periodically carry the anvils at a fixed rate of descent and to intermittently drop the anvils,
   (d) and means in addition to gravity to accelerate the dropping of the cam and anvils,
   (e) whereby friction is momentarily removed from the anvil support of the wheel pivot.

6. Appaparatus of the character described for intermittently lowering a wheel pivot and including:
   (a) a frame,
   (b) an elevating screw threadedly engaged in the frame,
   (c) a drop cam to turn with turning of the screw,
   (d) said screw being threaded to lower when turned and said cam being inclined to raise when turned,
   (e) said cam having a shoulder to intermittently drop an anvil for support of the wheel pivot.

7. Apparatus of the character described for intermittently lowering a wheel pivot and including:
   (a) a frame with a nut fixed therein and a drive hub aligned with the nut,
   (b) an elevating screw threadedly engaged in the nut and having driving engagement with the hub,
   (c) a pair of cam elements, one carried by the screw and the other guided by the frame,
   (d) said screw being threaded to lower when turned by the hub and the cam elements being inclined to correspondingly raise when so turned,
   (e) said cam elements having shoulders to intermittently drop an anvil for support of the wheel pivot.

8. Apparatus of the character described for intermittently lowering a wheel pivot and including:
   (a) a frame,
   (b) an elevating screw threadedly engaged in the frame,
   (c) a drop cam to turn with turning of the screw,
   (d) said screw being threaded to lower when turned and said cam being inclined to raise when turned,
   (e) said cam having a shoulder to intermittently drop an anvil for support of the wheel pivot,
   (f) and means in addition to gravity to accelerate the dropping of the cam and anvil.

9. Apparatus of the character described for intermittently lowering a wheel pivot and including:
   (a) a frame with a nut fixed therein and a drive hub aligned with the nut,
   (b) an elevating screw threadedly engaged in the nut and having driving engagement with the hub,
   (c) a pair of cam elements, one carried by the screw and the other guided by the frame,
   (d) said screw being threaded to lower when turned by the hub and the cam elements being inclined to correspondingly raise when so turned,
   (e) said cam elements having shoulders to intermittently drop an anvil for support of the wheel pivot,
   (f) and means in addition to gravity to accelerate the dropping of the supported cam element and anvil.

10. Apparatus of the character described for intermittently lowering a wheel pivot and including:
    (a) a frame with a nut fixed therein and a drive hub aligned with the nut,
    (b) an elevating screw threadedly engaged in the nut and having driving engagement with the hub,
    (c) a pair of cam elements, one carried by the screw and the other guided by the frame,
    (d) said screw being threaded to lower when turned by the hub and the cam elements being inclined to correspondingly raise when so turned,
    (e) said cam elements having shoulders to intermittently drop an anvil for support of the wheel pivot,
    (f) means in addition to gravity to accelerate the dropping of the supported cam element and anvil,
    (g) and drive means to rotate the hub.

(References on following page)

References Cited in the file of this patent

UNITED STATES PATENTS

| | | |
|---|---|---|
| 1,491,523 | Ekstrom | Apr. 22, 1924 |
| 1,591,101 | Ramsey | July 6, 1926 |
| 2,079,902 | De Witt | May 11, 1937 |
| 2,195,252 | McKinley et al. | Mar. 26, 1940 |
| 2,633,773 | Frederic | Apr. 7, 1953 |
| 2,737,814 | Loucks | Mar. 13, 1956 |

FOREIGN PATENTS

| | | |
|---|---|---|
| 2,416 of 1915 | Great Britain | Aug. 5, 1915 |